Figure 1:
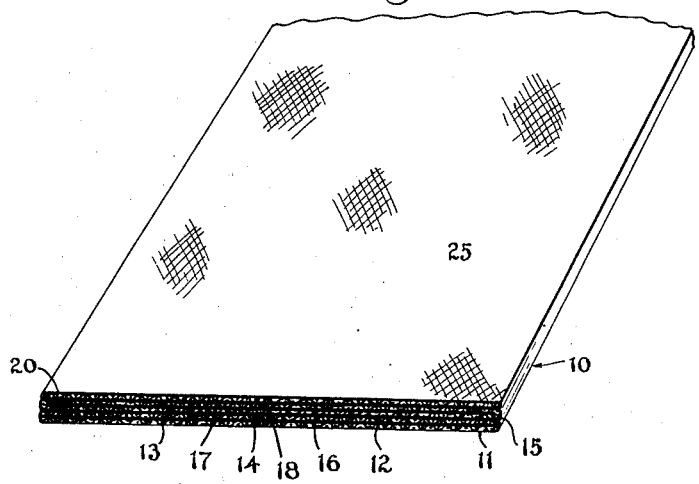

Feb. 20, 1934.  R. S. CARTER  1,948,332
CONVEYER BELT
Filed April 16, 1929

Raymond S. Carter, Inventor

By

Attorney

Patented Feb. 20, 1934

1,948,332

UNITED STATES PATENT OFFICE 1,948,332

CONVEYER BELT

Raymond S. Carter, Akron, Ohio, assignor to Wingfoot Corporation, Wilmington, Del., a corporation of Delaware Application April 16, 1929. Serial No. 355,639

2 Claims. (Cl. 198—193)

This invention relates to conveyer belts and it has particular relation to a belt for conveying articles that have a tendency to adhere to the surface of the belt thereby affecting the efficient operation of the latter.

One object of the invention is to provide a rubberized conveyer belt which is so constructed that hot rubber or the like conveyed thereon will not adhere to the surface of the belt.

Another object of the invention is to provide a conveyer belt, the surfaces of which have coefficients of friction such that the pulley engaging side of the belt efficiently engages the pulleys over which the belt is trained, whereas the conveyer side permits a free relative sliding movement of the belt and articles conveyed thereon should the movement of the articles be impeded by a stationary object or the like.

In the manufacture of elongate rubber articles such as rubber hose, the present practice includes the extrusion of rubber stock in continuous form and conveying it to other locations for further operations. This rubber stock is heated to a relatively high temperature by the extruding operation. Ordinary rubberized fabric conveyer belts would not efficiently convey this extruded heated stock because the latter had a tendency to adhere to the belt. An ordinary canvas belt having its plies sewed together instead of secured by rubber was found unsatisfactory because the pulley engaging side of the belt had a low coefficient of friction and did not efficiently engage the pulleys.

Moreover, ordinary rubberized fabric belting was found unsatisfactory for conveying articles such as pasteboard cartons because the conveyer side of the belt had such a high coefficient of friction. If one of the cartons were stopped and the conveyer belt continued to move, other cartons behind the impeded carton were piled up about the latter in irregular fashion, and frequently one on top of another. As it is essential to the efficient operation of a belt for conveying such cartons that the latter be prevented from piling up in this manner, rubberized belts were not employed very extensively in this capacity. Instead canvas belts of the type previously described were employed but, as pointed out, such belts did not have an efficient engagement with the pulleys over which they were trained.

According to this invention, it is proposed to construct a rubberized belt which secures the advantages of both the ordinary rubberized conveying belt and the canvas belt without retaining the aforesaid disadvantages peculiar to them.

This result is accomplished by the provision of a belt composed largely of rubberized fabric having a rubberized fabric pulley engaging side and a non-rubberized fabric conveyer side. Thus, the pulley engaging side of the belt has a high coefficient of friction, owing to the rubber on its surface, whereas the conveyer side of the belt has a relatively low coefficient of friction for efficiently conveying articles such as those previously pointed out. Another advantage of the proposed construction is that it retains the strength of the ordinary rubber belt referred to and has a considerably longer life than a canvas belt.

Figure 2:
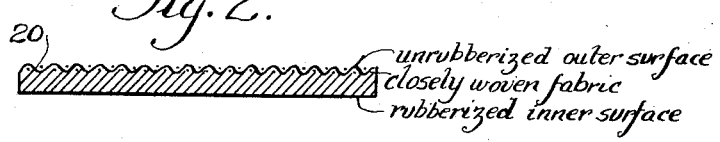

For a better understanding of the invention, reference is had to the drawing wherein Fig. 1 shows in fragmentary perspective a conveyer belt constructed according to one form of the invention; and Fig. 2 is a detail sectional view of the outer fabric layer.

According to the figure, a belt 10 is composed of an inner strip of woven fabric 11 having its edge portions 12 and 13 folded toward each other and the edges of the latter substantially abutting, as indicated at 14. Likewise, a second strip of fabric 15 has edge portions 16 and 17 folded toward each other and the edges of the latter substantially abutting as indicated at 18. As thus assembled, these strips of fabric comprise four plies of the belt. These plies are impregnated with rubber on both sides. Another ply 20 of woven fabric is disposed on the outer surface of the edge portions 16 and 17 but this ply is provided with rubber only on its surface adjacent the portions 16 and 17. Preferably, the warp cords of the fabrics 11, 15 and 20 extend longitudinally of the belt and the weft cords transversely thereof are impregnated with rubber by a calendering operation performed on both sides of the fabrics. Moreover, the latter may be so woven that rubber may be readily forced through the interstices between the cords during the calendering operation. Preferably, the fabric 20 is more closely woven than the fabrics 11 and 15 and only an inner surface thereof is calendered. Owing to the closeness of the weave of this fabric, the calendering operation does not force the rubber between the cords and hence, the outer surface 25 is free from rubber. As thus assembled, the layers of fabric composing the belt are vulcanized thereby resulting in a unitary construction.

The exposed surface of the fabric 11, i. e., the inner surface of the belt 10, is the pulley engaging or driving surface. The outer surface of the belt, i. e., the untreated fabric surface 25 is the conveying surface or that part of the belt provided for transporting packages or other articles.

A belt thus constructed possesses great strength owing to the combination of rubber and woven fabric. Moreover, the provision of a rubberized belt engaging surface results in a more efficient engagement of the belt with the pulleys by which it is driven. In other words, the coefficient of friction of the rubberized surface is such that a high percentage of the driving force of the pulley is transmitted to the belt. On the other hand, the outer surface 25 of the belt has a relatively low coefficient of friction which is desirable for conveying pasteboard cartons, hot tubed rubber stock and the like. Owing to the fact that this surface has a relatively low coefficient of friction, packages will freely slide relative to the belt should one package become impeded during its movement. Thus, the piling up of cartons on the belt is avoided. Moreover, by providing an untreated fabric surface for conveying heated tube stock, the tendency of the latter to adhere to the belt is not nearly so great as the tendency would be to adhere to a rubberized surface.

Although I have illustrated but the preferred form of the invention and have described that form in detail, it is apparent to those skilled in the art that the invention is not so limited but that various modifications may be made therein without departing from the spirit of the invention or from the scope of the appended claims.

What I claim is:

1. A conveyer belt comprising woven rubberized fabric, and a layer of woven fabric on the conveyer side of the belt having an outer surface entirely free from rubber and a rubberized inner surface, the fabric in the last mentioned layer being closely woven, thereby preventing the rubber on its inner surface from projecting therethrough.

2. A conveyer belt comprising a body of fabric impregnated with rubber, a layer of closely woven fabric on the conveyer side of the body, said last mentioned layer being entirely free from any coating or impregnating substances on its outer side and being secured to the body by rubber, the close weave of the fabric in such last mentioned layer preventing the rubber in the body from passing through it during vulcanization of the belt under pressure.

RAYMOND S. CARTER.